(12) United States Patent
Lachtarnik et al.

(10) Patent No.: US 8,090,727 B2
(45) Date of Patent: Jan. 3, 2012

(54) METHODS FOR AUTOMATICALLY GENERATING NATURAL-LANGUAGE NEWS ITEMS FROM LOG FILES AND STATUS TRACES

(75) Inventors: Marina Lachtarnik, Rishon Letzion (IL); Gil Raviv, Kfar-Sava (IL)

(73) Assignee: Check Point Software Technologies Ltd., Tel Aviv (IL)

( * ) Notice: Subject to any disclaimer, the term of this patent is extended or adjusted under 35 U.S.C. 154(b) by 743 days.

(21) Appl. No.: 12/123,544

(22) Filed: May 20, 2008

(65) Prior Publication Data
US 2009/0292719 A1 Nov. 26, 2009

(51) Int. Cl.
*G06F 17/30* (2006.01)
(52) U.S. Cl. .................................. 707/754; 707/804
(58) Field of Classification Search .................. 707/736, 707/754, 804; 704/9, 257
See application file for complete search history.

(56) References Cited

U.S. PATENT DOCUMENTS

| | | | | |
|---|---|---|---|---|
| 6,151,624 | A * | 11/2000 | Teare et al. | 709/217 |
| 7,630,986 | B1 * | 12/2009 | Herz et al. | 1/1 |
| 2002/0157023 | A1 * | 10/2002 | Callahan et al. | 713/201 |
| 2002/0184237 | A1 | 12/2002 | McFeely | |
| 2003/0065502 | A1 | 4/2003 | Zhu et al. | |
| 2003/0204540 | A1 * | 10/2003 | Rielau et al. | 707/204 |
| 2004/0114741 | A1 * | 6/2004 | Ngo et al. | 379/133 |
| 2004/0243588 | A1 * | 12/2004 | Tanner et al. | 707/100 |
| 2005/0114324 | A1 | 5/2005 | Mayer | |
| 2005/0149360 | A1 * | 7/2005 | Galperin | 705/2 |
| 2005/0278728 | A1 * | 12/2005 | Klementiev | 719/328 |
| 2006/0178910 | A1 * | 8/2006 | Eisenberger et al. | 705/3 |
| 2007/0033274 | A1 * | 2/2007 | Duan | 709/223 |
| 2007/0061347 | A1 * | 3/2007 | Burnley et al. | 707/100 |
| 2007/0250901 | A1 * | 10/2007 | McIntire et al. | 725/146 |
| 2008/0178076 | A1 * | 7/2008 | Kritt et al. | 715/257 |
| 2010/0036726 | A1 * | 2/2010 | Gallet | 705/14.43 |

* cited by examiner

*Primary Examiner* — Hanh Thai
(74) *Attorney, Agent, or Firm* — Mark M. Friedman

(57) ABSTRACT

Methods, for automatically generating natural-language news items from log files, including the steps of: gathering at least one data record; filtering at least one data record according to at least one rule to produce at least one filtered data set; aggregating at least one filtered data set; analyzing at least one filtered data set for at least one statistical trend; and automatically generating a news item based on at least one statistical trend. Preferably, the method further includes the step of: customizing the news item based on a relative importance of at least one statistical trend. Preferably, the method further includes the step of: performing a drill-down analysis on at least one statistical trend. Most preferably, the method further includes the step of: enriching the news item based on the drill-down analysis. Preferably, the method further includes the step of: embedding at least one graphical element into the news item.

15 Claims, 4 Drawing Sheets

METHODS FOR AUTOMATICALLY GENERATING NATURAL-LANGUAGE NEWS ITEMS FROM LOG FILES AND STATUS TRACES

FIELD AND BACKGROUND OF THE INVENTION

The present invention relates to methods for automatically generating natural-language news items from log files and status traces.

The ability to automatically generate natural-language news items could save a vast amount of resources while delivering information to concerned readers at an unprecedented response rate. Current methods known in the art typically scan existing news databases for keywords provided by a user in the user's personal preferences. However, such methods are incapable of generating news items solely from data records. Such methods can extract facts from press releases or other reported news items to harvest information for constructing new news items, but rely on the information in such published articles for providing the essence of the newsworthy attributes of the subject.

In the prior art, Mayer, in US Patent Publication No. 20050114324 (hereinafter referred to as Mayer '324), discloses a system and method for improved searching on the internet or similar networks and especially improved MetaNews and/or improved automatically generated newspapers. McFeely, in US Patent Publication No. 20020184237 (hereinafter referred to as McFeely '237), discloses methods and apparatus for compiling, processing, and disseminating equity transaction data. Zhu et al., in US Patent Publication No. 20030065502 (hereinafter referred to as Zhu '502), discloses text-based automatic content classification and grouping. However, most of these methods do not generate truly-new natural-language news items from data records. While MeFeely '237 discloses methods for analyzing such data records, the information is not developed into a typical, natural-language news story as it is commonly understood.

It would be desirable to have methods for automatically generating natural-language news items from log files and status traces. Such methods would, among other things, overcome the limitations of the prior art as described above.

SUMMARY OF THE INVENTION

It is the purpose of the present invention to provide methods for automatically generating natural-language news items from log files and status traces.

Preferred embodiments of the present invention teach methods for automatically generating news items by:
(1) log aggregation and counter aggregation from distributed computing systems (e.g. security and/or other IT systems);
(2) statistical trend analysis;
(3) automatic selection of news items that are newsworthy based on the statistical trend or anomaly found, and/or on the history of previous news items (e.g. a follow-up story); and
(4) automatic generation of a news item based on a data record(s) (e.g. type of logs or counters from monitored systems).

Therefore, according to the present invention, there is provided for the first time a method for automatically generating a natural-language news item, the method including the steps of: (a) gathering at least one data record; (b) filtering at least one data record according to at least one rule to produce at least one filtered data set; (c) aggregating at least one filtered data set; (d) analyzing at least one filtered data set for at least one statistical trend; and (e) automatically generating a news item based on at least one statistical trend.

Preferably, the method further includes the step of: (f) customizing the news item based on a relative importance of at least one statistical trend.

Most preferably, the relative importance is based on a history of at least one statistical trend.

Preferably, the method further includes the step of: (f) performing a drill-down analysis on at least one statistical trend.

Most preferably, the method further includes the step of: (g) enriching the news item based on the drill-down analysis.

Preferably, the method further includes the step of: (f) embedding at least one graphical element into the news item.

Preferably, the method further includes the step of: (f) assessing the news item for a relative ranking.

Most preferably, the relative ranking is based on a record of previous news items.

Preferably, the step of automatically generating includes: (f) selecting a news-item template from a plurality of templates.

Most preferably, the step of automatically generating further includes: (ii) obtaining at least one data parameter from at least one statistical trend; and (iii) inserting at least one data parameter into the news-item template.

More preferably, the step of automatically generating her includes: (ii) inserting at least one keyword into the news-item template.

Most preferably, the step of automatically generating further includes: (iii) prior to the step of inserting, selecting at least one keyword based on at least one statistical trend.

More preferably, the step of automatically generating further includes: (iii) prior to the step of inserting, selecting at least one keyword from a list of synonymous keywords.

Most preferably, the selecting is random.

Most preferably, the selecting is based on keyword usage in a record of previous news items.

More preferably, the selecting is based on a relative severity of at least one statistical trend.

Most preferably, the relative severity is based on a history of at least one statistical trend.

Preferably, the step of analyzing includes performing at least one numerical operation on at least one filtered data set.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to methods for automatically generating natural-language news items from log files and status traces. The principles and operation for automatically generating such natural-language news items, according to the present invention, may be better understood with reference to the accompanying description and the drawings.

Figure 1:
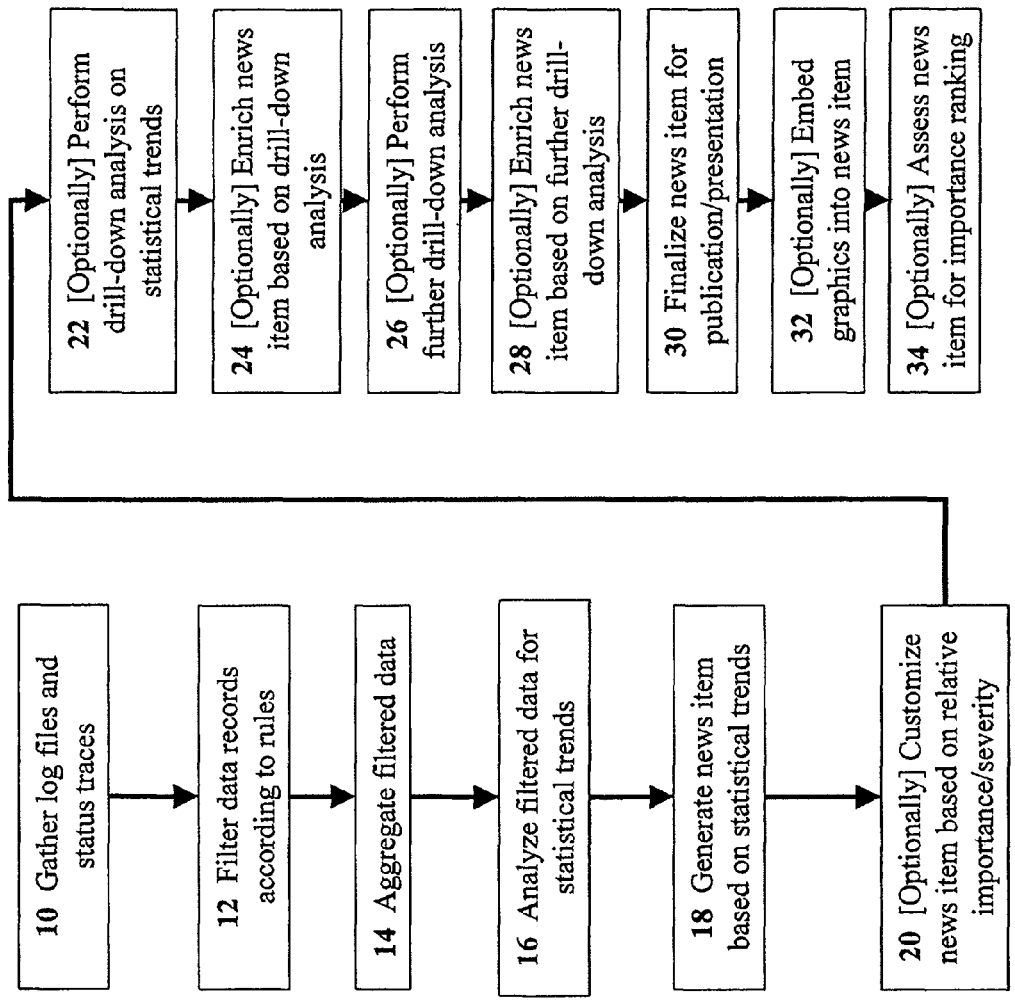
FIG. 1 is a simplified flowchart of the major operational steps or automatically generating a natural-language news item from log files and status traces, according to preferred embodiments of the present invention.

Referring now to the drawings, FIG. 1 is a simplified flowchart of the major operational steps for automatically generating a natural-language news item from log files and status traces, according to preferred embodiments of the present invention. An exemplary embodiment is used to describe how a news item is automatically generated from "raw-data" records. In the context of the present invention, the main difference between log files and status traces is that status traces can be sent from systems that do not maintain a persistency of files (e.g., over SNMP traps), whereas log files are persistent on host systems.

Figure 2:
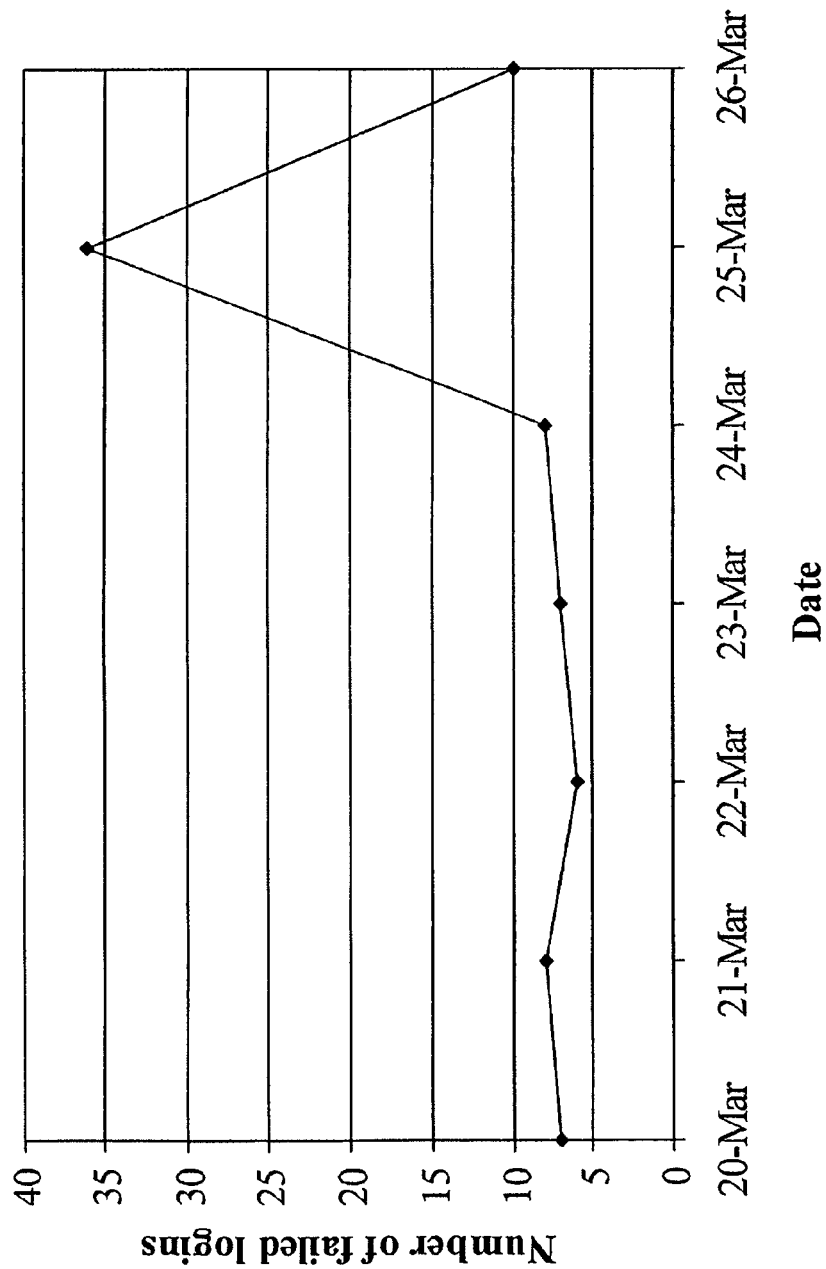
FIG. 2 is a graph of the number of daily failed logins as an exemplary embodiment of the process of FIG. 1, according to preferred embodiments of the present invention.

To simplify the description, records of login failures are used as the raw data for generating the news item. Initially, the system gathers data logs (Step 10), and filters the logs according to a set of predefined rules (Step 12). For example, the relevant filtered logs may appear as follows:

23 Mar. 2008 12:01 PM "Admin 2" failed to login finance portal
24 Mar. 2008 17:22 PM "Admin 3" failed to login finance portal
25 Mar. 2008 10:50 AM "Admin 1" failed to login finance portal
25 Mar. 2008 10:50 AM "Admin 1" failed to login finance portal
25 Mar. 2008 10:51 AM "Admin 1" failed to login finance portal The system then aggregates the filtered data (Step 14). In the exemplary embodiment, the number of daily failures is counted. The system then analyzes the filtered data in order to automatically detect any statistical trends (e.g. peaks, inclines, declines, and/or relatively static periods) (Step 16). FIG. 2 is a graph of the number of daily failed logins as an exemplary embodiment of the process of FIG. 1, according to preferred embodiments of the present invention.

The analysis of the filtered data in Step 18 can include performing various numerical or logical operations (e.g. average, max, min, and standard deviation). When multiple sets of filtered data are used, such calculation can be performed on all of the sets. For example, a login-success ratio can use two sets for each user:

(1) all the logs of the user's successful logins (assume S represents the size of this set); and
(2) all the logs of the user's failed logins (assume F represents the size of this set).

Then, the login-success ratio of $$\frac{S}{S+F}$$

can be recalculated.

Returning to FIG. 1, based on the statistical trends of the filtered data obtained in Step 16, a news item is generated (Step 18). In the exemplary embodiment, a news item may read as follows, for example:

"A surge of failed login activity was detected on March $25^{th}$ as thirty six login attempts were made on the finance portal."

In order to generate such a news item, the system has a set of predefined templates and keywords that are tailored to the news item. For example, from the following news-item template, the system can generate the exemplary news item above:

"A [statistical type] of [parameter name 1] was detected on [date] as [value] [parameter name 2] were made on the [product name]."

The variable statistical type is dynamically selected from a set of keywords (e.g. peak, surge, increase, and decrease). The system selects the keyword that fits the statistical nature of the specific trend. Optionally, the system can customize the news item based on its relative importance/severity (Step 18). For example, the system may select a different keyword, for each news item, from a set of synonyms based on the severity of the phenomenon (e.g. the word "surge" is selected instead of the word "increase" since the increase that was identified is relatively high). Alternatively, the system may randomly select a keyword from a set of synonymous keywords. A random selection of synonyms results in a more natural-sounding and less repetitive text.

The rest of the variables from the news-item template above are selected based on the measured parameter (e.g. login failures) and its relevant values:

parameter name 1=failed login activity
date=March $25^{th}$
value=36
parameter name 2=login attempts
product name=finance portal After the system automatically detects any statistical trends in Step 16, the system may optionally perform a "drill-down" analysis into the statistical trends (Step 22). In the exemplary embodiment, such an analysis could include the login failure data during peak usage time. Since the original logs include the user name logging into the system, and since the user name can be predefined as a relevant field for the drill-down analysis, the system can count the number of failures by each user during the peak time.

For example, the drill-down analysis may determine that the number of failed logins was split among users as follows:

Admin 1=32
Admin 2=1
Admin 3=3

Figure 3:
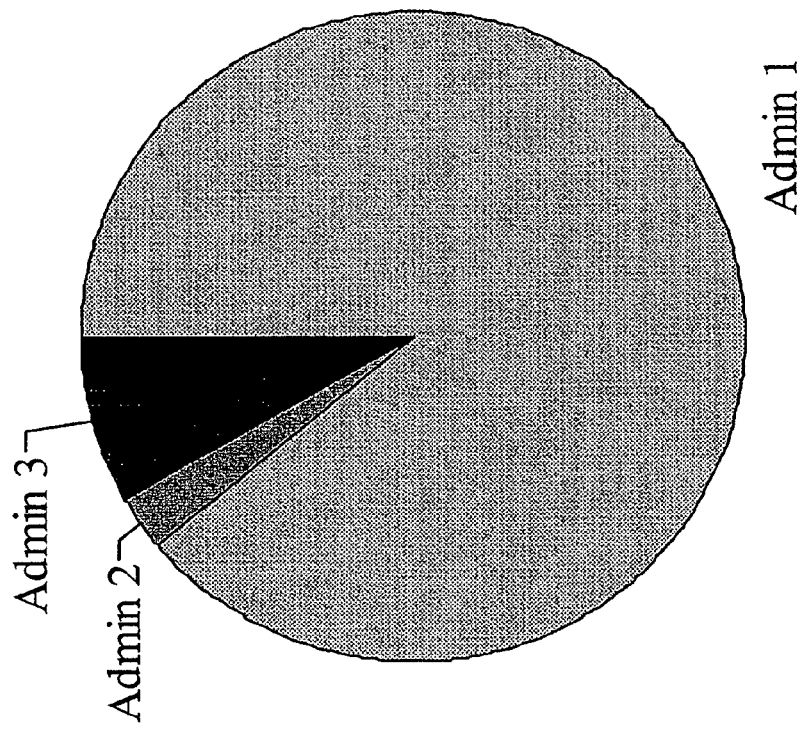
FIG. 3 is a pie chart of the number of failed logins per user as an embodiment of a drill-down analysis of the data trend of FIG. 2, according to preferred embodiments of the present invention.

FIG. 3 is a pie chart of the number of failed logins per user as an exemplary embodiment of a drill-down analysis of the data trend of FIG. 2, according to preferred embodiments of the present invention.

Returning again to FIG. 1, the system can optionally enrich the news item based on the drill-down analysis (Step 24). For example, the following sentence can be added to the news item:

"Most of the failed logins were generated by the user: Admin 1."

Further drill-down analysis can be performed by the system (Step 26). For example, the system can analyze how frequently "Admin 1" fails to log into the system based on prior log files. The news item can then be further enriched by the findings of the drill-down analysis (Step 28). For example, two possible enrichments to the news item can be generated:

"Most of the failed logins were generated by the user: Admin 1, who occasionally fails to log into the finance portal."

Or,

"Most of the failed logins were generated by the user: Admin 1, who had never failed before to log into the finance portal to such an extent."

The news item is then finalized for publication and/or presentation (Step 30).

Optionally, the news item can be embedded with associated graphical elements (e.g. tables, graphs, charts, positive performance symbols, and/or negative performance symbols) (Step 32). Finally, the generated news item can be assessed for its "newsworthiness" based on the trend analysis and a history of previous news items, and ranked based on importance (Step 34). Such ranking can be used to decide whether the news item will be published or not in a next edition of a news listing.

Figure 4:
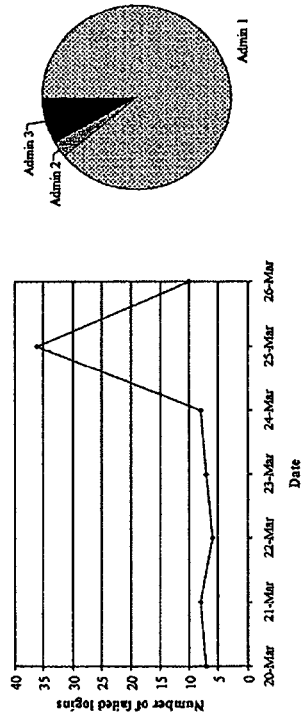
FIG. 4 shows a complete news item with embedded graphics automatically generated from the exemplary embodiment of FIGS. 2 and 3, according to preferred embodiments of the present invention.

FIG. 4 shows a complete news item with embedded graphics automatically generated from the exemplary embodiment of FIGS. 2 and 3, according to preferred embodiments of the present invention.

Other exemplary headlines and associated captions are provided below in order to convey the versatility of embodiments of the present invention.

Exemplary Headline 1: Refusal to perform AV scan by users weakens endpoint protection Exemplary Caption 1: Corporate compliance is at risk as 375 users have refused to perform anti-virus (AV) scans for more than a week.

Exemplary Headline 2: Surge of blocked programs on endpoints

Exemplary Caption 2: On March $9^{th}$ a sudden peak of blocked program alerts was detected as 730 endpoints were trying to access forbidden applications.

Exemplary Headline 3: Data security infrastructure violates corporate policy as most of the installed agents are older than a year Exemplary Caption 3: The majority of disk-encryption agents (67%) was not upgraded since March 2006. Among the 511 agents, there are 18 different old versions which suggest that the patch management is not effective.

Exemplary Headline 4: Ineffective protection from spyware on endpoints as "compliant" users postpone periodic scans Exemplary Caption 4: Corporate compliance is at high risk as 270 out of 1694 users have refused to perform anti-spyware scans for more than a week. As 39 users have never scanned their computer, but are reported as compliant, it is imperative to further restrict endpoint compliance policies.

Exemplary Headline 5: Virus alerts are stabilized—the surge of virus alerts on February $20^{th}$ was investigated Exemplary Caption 5: For two weeks, the number of virus alerts on endpoints remains low. The last surge of alerts on February $20^{th}$ originated from a single user, and consisted of more than 20 different attack types. According to IT personnel who investigated the incident, and closed the incident on March $11^{th}$, "A user tested a hacking tool as part of a research project, and was instructed to use . . . ."

While the invention has been described with respect to a limited number of embodiments, it will be appreciated that many variations, modifications, and other applications of the invention may be made.

What is claimed is:

1. A method for automatically generating a natural-language news item, the method comprising the steps of:
   (a) gathering at least one data record;
   (b) filtering said at least one data record according to at least one rule to produce at least one filtered data set;
   (c) aggregating said at least one filtered data set, in a storage device;
   (d) analyzing, by a processor, said at least one filtered data set for at least one statistical trend; and
   (e) automatically generating, by said processor, a news item based on said at least one statistical trend, wherein the automatically generating includes:
      (i) selecting a news-item template from a plurality of templates;
      (ii) selecting at least one keyword based on said at least one statistical trend; and
      (iii) inserting said at least one keyword into said news-item template.

2. The method of claim 1, the method further comprising the step of:
   (f) customizing said news item based on a relative importance of said at least one statistical trend.

3. The method of claim 2, wherein said relative importance is based on a history of said at least one statistical trend.

4. The method of claim 1, the method further comprising the step of:
   (f) performing a drill-down analysis on said at least one statistical trend.

5. The method of claim 4, the method further comprising the step of:
   (g) enriching said news item based on said drill-down analysis.

6. The method of claim 1, the method further comprising the step of:
   (f) embedding at least one graphical element into said news item.

7. The method of claim 1, the method further comprising the step of:
   (f) assessing said news item for a relative ranking.

8. The method of claim 7, wherein said relative ranking is based on a record of previous news items.

9. The method of claim 1, wherein said step of automatically generating further includes:
   (ii) obtaining at least one data parameter from said at least one statistical trend; and
   (iii) inserting said at least one data parameter into said news-item template.

10. The method of claim 1, wherein said selecting of said at least one keyword further includes selecting said at least one keyword from a list of synonymous keywords.

11. The method of claim 10, wherein said selecting from said list of synonymous keywords is random.

12. The method of claim 10, wherein said selecting from said list of synonymous keywords is based on keyword usage in a record of previous news items.

13. The method of claim 1, wherein said selecting is based on a relative severity of said at least one statistical trend.

14. The method of claim 13, wherein said relative severity is based on a history of said at least one statistical trend.

15. The method of claim 1, wherein said step of analyzing includes performing at least one numerical operation on said at least one filtered data set.

* * * * *